J. HIGGINS & P. TRAYNOR.
VELOCIPEDES.
No. 194,681.    Patented Aug. 28, 1877.
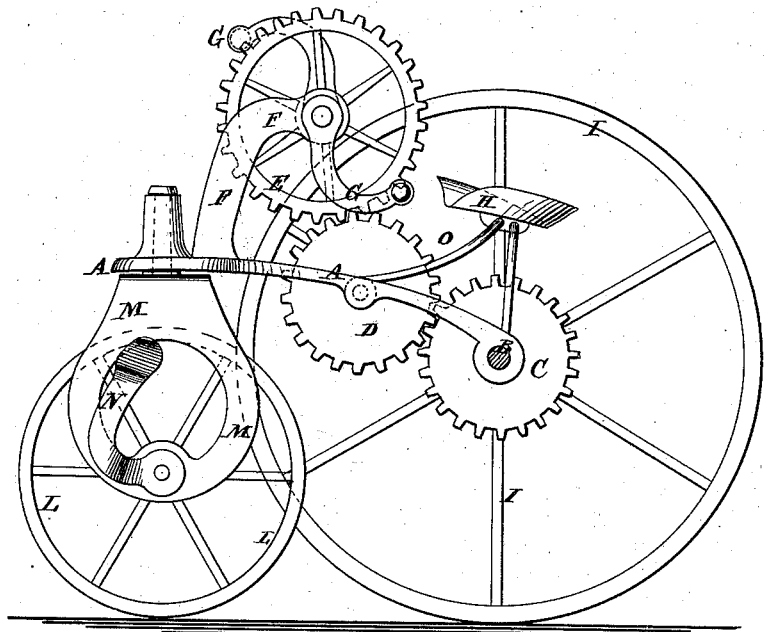
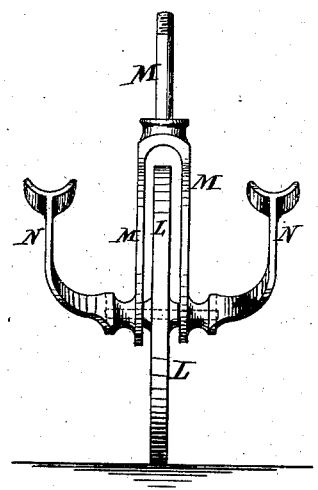
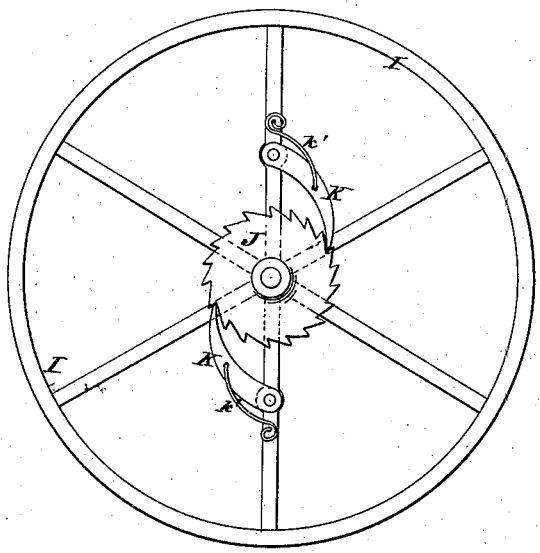
WITNESSES:
INVENTORS
J. Higgins.
BY P. Traynor.
ATTORNEYS.

UNITED STATES PATENT OFFICE.

JAMES HIGGINS AND PATRICK TRAYNOR, OF WESTFIELD, NEW JERSEY.

IMPROVEMENT IN VELOCIPEDES.

Specification forming part of Letters Patent No. 194,681, dated August 28, 1877; application filed April 9, 1877.

*To all whom it may concern:*

Be it known that we, JAMES HIGGINS and PATRICK TRAYNOR, of Westfield, in the county of Union and State of New Jersey, have invented a new and useful Improvement in Velocipedes, of which the following is a specification:

Figure 1 is a side view of our improved velocipede, the near wheel being removed. Fig. 2 is a front view of the forward wheel and its attachments. Fig. 3 is a side view of the near wheel.

Similar letters of reference indicate corresponding parts.

The object of this invention is to furnish an improved velocipede, which shall be simple in construction, inexpensive in manufacture, and easily propelled and guided.

The invention will first be described in connection with the drawing, and then pointed out in the claim.

A is the frame of the machine. In bearings in the rear end of which revolves the axle B. I are the rear wheels, which revolve upon the journals of the axle B. To the axle B are attached ratchet-wheels J, with the teeth of which engage the pawls K, attached to the wheels I, and held against the ratchet-wheels J by the springs k'. This construction causes the axle B to carry the wheels I with them in their revolution, and at the same time allows one wheel to move faster than the other in turning around, without either wheel sliding.

To the center of the axle B is attached a gear-wheel, C, the teeth of which mesh into the teeth of the gear-wheel D. The gear-wheel D is pivoted to the frame A, and its teeth mesh into the teeth of the gear-wheel E. The gear-wheel E is pivoted to the upper end of a slotted arm or standard, F, attached to or formed upon the forward part of the frame A.

To the ends of the journals of the gear-wheel E are attached cranks G, for the rider to take hold of to propel the machine.

The rider sits upon the seat H, the standard O of which is attached to the frame A.

L is the forward wheel, which is pivoted to the forked lower end of the standard M. The upper end of the standard M has a journal formed upon it, which works in an upright bearing formed upon the forward end of the frame A, and is secured in said bearing by a nut and washer.

To the lower end of the standard M are secured the lower ends of two curved arms, N, the upper ends of which are forked to receive the rider's feet, so that the rider can steer the velocipede with his feet while propelling it with his hands.

The gear-wheels C D E should be incased or provided with shields, to prevent them from rubbing against or catching upon the rider's clothes.

Having thus described our invention, we claim as new and desire to secure by Letters Patent—

A velocipede having the foot-rests N N for operating the guide-wheel, the hand-gear C D E, and the seat H, arranged in connection with frame A, as shown and described, so that the rider can sit in his seat while he rotates a wheel that actuates the drive mechanism, and guides the vehicle with his feet.

JAMES HIGGINS.
PATRICK TRAYNOR.

Witnesses:
GEO. GODFREY,
FRED. K. WILCOX.